No. 756,255. PATENTED APR. 5, 1904.
H. M. LOVE.
HARROW.
APPLICATION FILED JULY 18, 1900.
NO MODEL.
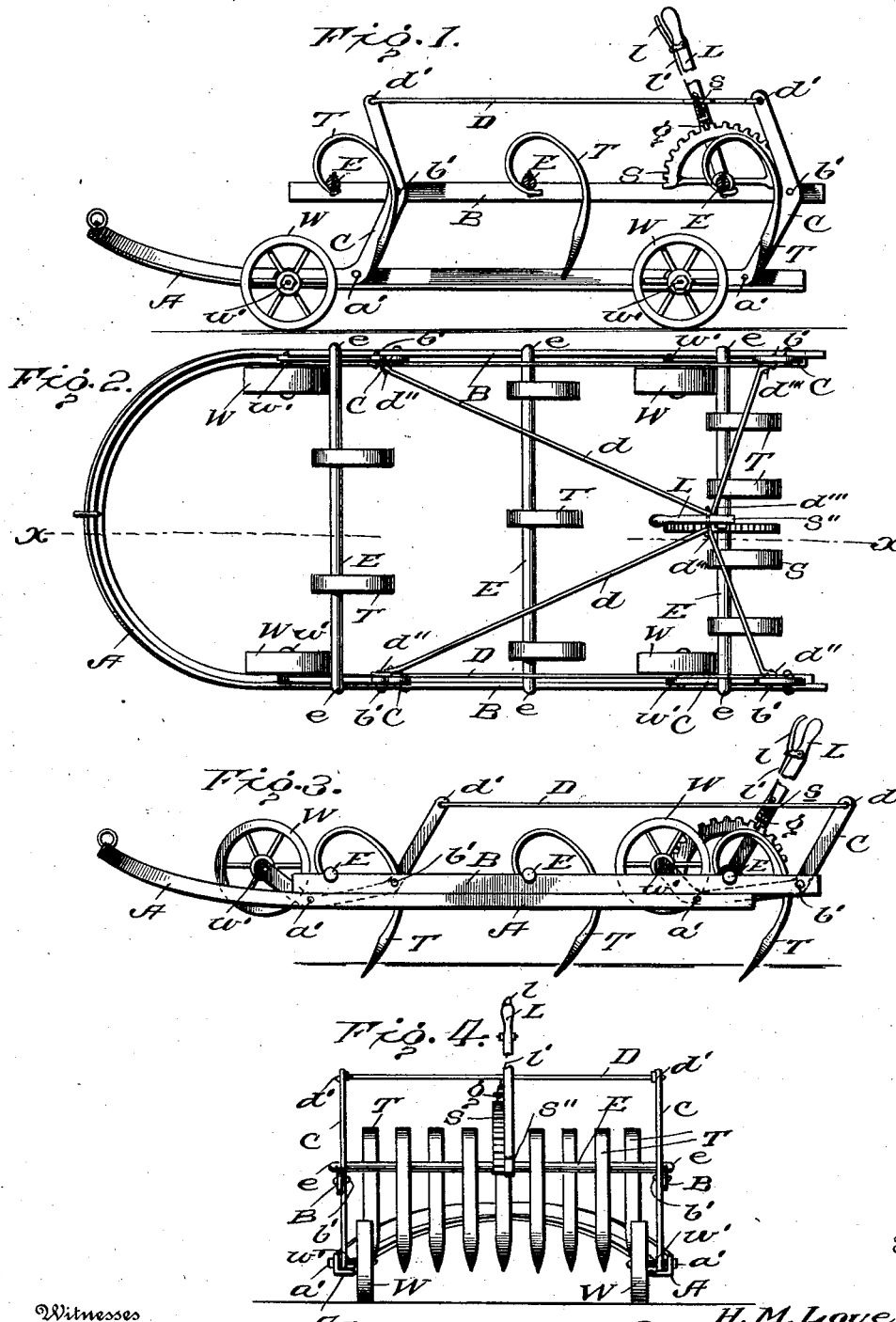

No. 756,255. Patented April 5, 1904.

UNITED STATES PATENT OFFICE.

HENRY M. LOVE, OF UTICA, NEW YORK.

HARROW.

SPECIFICATION forming part of Letters Patent No. 756,255, dated April 5, 1904.

Application filed July 18, 1900. Serial No. 24,018. (No model.)

*To all whom it may concern:*

Be it known that I, HENRY M. LOVE, a citizen of the United States of America, and a resident of Utica, Oneida county, New York, (whose post-office address is Utica, Oneida county, New York,) have invented certain new and useful Improvements in Harrows, of which the following is a specification.

My invention relates to an improvement in harrows whereby the teeth can be elevated or depressed without changing their angle of operation; and I do declare that the following is a clear, accurate, and complete description thereof, so as to enable one skilled in the art to make and use the same, reference being had to the accompanying drawings, wherein like letters represent like parts.

Figure 1 represents a sectional view of my harrow, drawn on the line $x$ $x$ of Fig. 2, showing the teeth in an elevated position. Fig. 2 is a top view. Fig. 3 represents an outside view with the teeth down. Fig. 4 represents an end view from the rearward with the teeth elevated.

Referring to the figures more in detail, A represents a draft-frame, which I have shown as constructed of angle-iron.

B represents side bars, to which are fixedly attached at $e$ in some suitable manner the tooth-bars E, to which in turn are fixedly attached in some suitable manner the teeth T, so that the bars B and the tooth-bars E form a rigid frame in such shape and dimensions as may be desired, to which are fixedly attached the teeth in such positions as may be chosen.

I do not limit myself to the exact proportions in the frames indicated by the drawings, as they may be of different sizes and the connecting-levers between the two may be disposed at different points and on different sides of the frames, one frame being thus narrower than the other.

C represents bent arms which are employed, primarily, for the purpose of connecting the draft-frame with the tooth-bar frame and holding them in parallel planes at such distance from each other as may be desired in the manner hereinafter shown. These bars are attached pivotally to the tooth-bar frame at $b'$ and to the draft-frame at $a'$, and the portions included between the points of attachment are parallel to each other, so that they, with the draft-frame and the tooth-bar frame, form the sides of a parallelogram. The arms C are extended upward and forward for a suitable distance beyond the point $b'$. Upon one of the tooth-bars, shown here as the rearward one, is pivotally attached a lever L, and by its side is fixedly attached a toothed or notched segment S. The lever has a dog $g$ held against the notches of the segment by the spring $s$, which may be withdrawn from contact with the notches by operating the handle $l$, which is connected with the dog by the rod $l'$.

D represents the connecting-rods which pivotally join the upper ends of the arms C at $d'$.

$d$ represents guy-rods which are fixedly attached to the connecting-rods D, at one end thereof, $d''$, and pivotally attached to the lever L at the other end at $d'''$ and holding the lever parallel with the upper extensions of arms C.

The upper extended portions of the arms C are extended parallel to each other and parallel to the lever, and the connecting-rods D are parallel to the plane of the tooth-bar frame, so that the connecting-rods and the tooth-bar frame and the upper extended portions of the arms C form the sides of a parallelogram in which the lever L moves parallel to the upper portions of the arms. The arms C are also extended from the points $a'$ downward and forward a suitable distance, and at the end thereof, at the point $w'$, are pivotally attached the wheels W.

In operation the lever L is thrust forward, which forces the portions of the arms C between the draft-frame and the tooth-bar frame into an upward position and raises the tooth-bar frame at a distance above the plane of the draft-frame, and thereby holds the teeth out of contact with the ground when the dog on the lever is allowed to engage with the teeth of the notched segment. At the same time the downward extensions of the arms C, which bear the wheels, are thrust downward and the wheels are forced below the plane of the draft-frame and form a riding contact for the harrow. When the lever is released and brought backward, the main portions of the arms C are thrust into nearly a horizontal position and plane of the draft-frame and of the tooth-bar frame are brought together and the teeth are in a position to enter the soil. At the same time the lower extensions of the arms C are elevated, which raises the wheels W entirely or partially above the plane of the draft-frame, as may be desired, so that the teeth may be inserted to a certain depth and the harrow allowed to ride on the draft-frame, or the arm C may have such a length or direction as to bring the circumference of the wheels below the draft-frame even when the teeth are at their full depth.

It is evident that various changes might be made in the forms, constructions, and arrangements of the parts described without departing from the spirit and scope of my invention. Hence I do not wish to limit myself to the exact constructions described.

What I claim as new, and desire to secure by Letters Patent, is—

1. In a harrow, in combination, a draft-frame adapted to be coupled with the draft, a tooth-frame arranged approximately parallel with and above the draft-frame and provided with teeth, lifting-levers pivotally joined to and connecting said draft and tooth frames and constituting draft connections from the draft-frame to the tooth-frame, and means for simultaneously operating and locking said levers, substantially as described.

2. In a harrow a tooth-bar frame, tooth-bars fixedly attached thereto, teeth attached to the tooth-bars, a draft-frame, arms pivotally attached to the draft-frame supporting the tooth-bar frame in a plane parallel to the draft-frame pivotally connected at their upper ends by connecting-rods, a notched segment fixedly attached to one of the tooth-bars, a lever pivotally attached to one of the tooth-bars provided with a dog for engaging the notched segment, guy-rods connecting the lever with the connecting-rods, in combination, substantially as set forth.

3. In a harrow, a draft-frame, a tooth-bar frame, provided with teeth, parallel arms pivotally attached to the tooth-bar frame supporting the same pivotally on the draft-frame, the said arms extending beyond the plane of the draft-frame, wheels pivotally attached to the ends of the arms, means for supporting the tooth-bar frame at variable distance from the draft-frame in combination, substantially as set forth.

4. In a harrow a draft-frame, a tooth-bar frame having teeth, the said draft-frame and tooth-bar frame held in parallel planes by arms pivotally attached, parallel to each other, to the said draft-frame and tooth-bar frame, the said arms extending above the plane of the tooth-bar frame, a lever pivotally attached to the tooth-bar frame, locking means therefor, rods and guys pivotally connecting the upper extremities of the arms with the lever, the points of such connection being on a plane parallel to the plane of the draft-frame and the tooth-bar frame combined, substantially as described.

5. In a harrow, a draft-frame, tooth-bars with teeth fixedly attached thereto, side bars fixedly connecting the tooth-bars, arms parallel to each other pivotally connecting the draft-frame and tooth-bar frame in parallel planes, the said arms extending below the plane of the draft-frame and provided with ground-wheels, a lever pivotally attached to the tooth-bar frame, connecting-rods pivotally connecting the lever and the upper extremities of the arms, the said lever and the upper portions of the said arms being adjusted in planes parallel to each other and transverse of the harrow, in combination, substantially as set forth.

6. In a harrow, in combination, a draft-frame, a vertically-movable tooth-frame provided with teeth, series of levers pivotally joined to the draft-frame and at intermediate points in their lengths pivotally joined to the tooth-frame, the ends of said levers extended, a hand-lever mounted on the tooth-frame and operatively connected with said ends of said levers, and locking means, substantially as described.

7. In a harrow, in combination, a lower horizontal frame, an upper vertically-movable horizontal frame carrying teeth, and means comprising lifting-levers, and a hand-lever mounted on the tooth-frame for raising and lowering the upper frame and locking the same rigidly and fixedly at the desired elevation with respect to the lower frame, substantially as described.

8. In a harrow, in combination, a lower frame, a vertically-movable upper frame provided with teeth, supporting connections between said frames provided with ground-supports, and operating means arranged to depress said ground-supports as the upper frame is raised and to raise said ground-supports as said upper frame is lowered, substantially as described.

9. In combination, in a harrow, a draft-frame, a vertically-movable tooth-frame arranged above and parallel with said draft-frame and comprising side bars and tooth-bars rigid therewith and provided with teeth, a hand-lever mounted on said tooth-frame and provided with locking means, and series of vertically-disposed levers pivoted to said draft-frame and extended upwardly and pivoted to the tooth-frame and operatively connected with said hand-lever and adapted to be swung thereby on the draft-frame to raise and lower said tooth-frame, substantially as described.

10. In a harrow, in combination, a draft-frame, a vertically-movable tooth-frame provided with teeth, series of lifting-levers between their ends pivotally joined to said draft-frame, corresponding ends of said levers provided with ground-supports and the corresponding opposite portions of said levers pivotally joined to said tooth-frame, and operating and locking means for said levers arranged to simultaneously swing the levers to raise and lower said tooth-frame, substantially as described.

11. In a harrow, in combination, a draft-frame adapted to have the draft coupled therewith, a vertically-movable tooth-frame parallel with the draft-frame and carrying teeth, a hand-lever mounted on the tooth-frame and provided with locking means, and lifting-levers fulcrumed to the draft-frame and pivotally joined to said tooth-frame to raise and lower the same and having upwardly-projected ends all operatively connected with said lever, substantially as described.

12. In combination, in a harrow, a draft-frame, a vertically-movable tooth-frame provided with teeth, vertically-swinging lifting-levers pivotally connecting said frames and determining the vertical position of the tooth-frame with respect to the draft-frame, said levers having extended ends provided with ground-supports moving vertically simultaneously with but in an opposite direction to the vertical movement of said tooth-frame, and an operating-lever connected with all of said lifting-levers, substantially as described.

13. In a harrow, the combination of a rigid tooth-frame carrying teeth rigidly fixed thereon, a draft-frame, parallel levers provided with supporting ends pivotally attached to the draft-frame and pivotally supporting the tooth-frame, connections between the levers, and means for locking the levers, substantially as shown.

14. In a harrow, the combination of a tooth-frame carrying teeth rigidly secured thereon, a draft-frame, parallel members pivotally connecting the frames parallel to each other, pivotal connections between such members and a set-lever, a set-lever and lock operative to secure the frames in fixed relation, substantially as shown.

15. In a harrow, the combination of a tooth-frame carrying teeth, a draft-frame, lever connections between the two and extending down and forward from their attachment to the draft-frame, ground-supports connected with such ends of the levers, operative connections for actuating the levers in unison, locking means for securing the frames and ground-supports rigidly in a given position, substantially as shown.

16. In a harrow, the combination of a draft-frame, a tooth-frame carrying teeth, ground-supports, arms pivotally connecting the frames and the supports, pivotal connections between the arms and a set-lever, and a set-lever simultaneously to adjust the relative position of the frames and the supports and to secure the same in place, substantially as set forth.

17. In a harrow, the combination of a draft-frame, a tooth-frame carrying teeth and located above the draft-frame, ground-supports, means coöperating to adjust and maintain the relative positions of the parts and to maintain the line of draft substantially direct from front to rear, substantially as shown.

18. In a harrow, the combination of a draft-frame, a tooth-frame carrying teeth, ground-supports, lever connections between the frames and the ground-supports, locking means connected with the lever connections, and coöperating therewith to hold the parts of the harrow in fixed position, the frames being parallel, to operate as an integral structure, substantially as shown.

19. In a harrow, in combination, a tooth-frame carrying teeth and supported above the draft-frame, a draft-frame, lifting devices for raising the tooth-frame above the draft-frame and supporting it thereon in a fixed position parallel thereto and at a desired distance therefrom, substantially as shown.

20. In a harrow, in combination, a horizontal draft-frame, a horizontal tooth-frame carrying teeth, levers connecting the two frames and extended to ground-supports, ground-supports, means for locking the levers, whereby the frames and the ground-supports are held in operation in fixed planes as adjusted, substantially as shown.

21. In a harrow, in combination, a tooth-carrying frame, teeth, a draft-frame, levers pivotally mounted on the tooth-frame and pivotally connected to the draft-frame, a set-lever operatively connected with the said levers to elevate and secure the draft-frame relatively to the tooth-points, substantially as shown.

22. In a harrow, in combination, a tooth-carrying frame, a draft-frame, ground-supports, levers pivotally mounted on the tooth-frame and pivotally attached to the draft-frame and terminated with the ground-supports, a set-lever operatively connected to the said levers to adjust and secure in place the draft-frame and the ground-supports in relation to the harrow-teeth, substantially as shown.

23. In a harrow, a draft-frame, ground-supports pivoted thereto, an independent tooth-frame carrying teeth and located above the draft-frame, lever connections between the draft-frame and the tooth-frame and connected with the ground-supports to give the teeth the desired depth of cut, the harrow being carried on the ground-supports, and to hold the teeth in the desired position, in combination, substantially as shown.

24. In a harrow, a draft-frame, a tooth-frame carrying teeth, levers connecting the frames and being extended to carry ground-supports, ground-supports, operative connections between the levers and adjusting and locking means, adjusting and locking means to elevate the draft-frame and the ground-supports above the soil when the harrow-teeth are at work, in combination, substantially as shown.

25. In a harrow, a draft-frame, a tooth-carrying frame located above the draft-frame, ground-supports, pivotal connections between the frames and the ground-supports, lever connections and a lock adapted to operate the pivotal connections and to hold the frames in fixed planes relative to that of the ground-supports, in combination, substantially as shown.

26. In a harrow, a draft-frame, a tooth-frame with teeth, levers bearing ground-supports and pivoted to the frames and adapted to shift the line of the draft relatively to the teeth and the ground-supports, in combination, substantially as described.

27. In a harrow, in combination, a rigid draft-frame, a rigid tooth-frame provided with teeth located in a plane parallel to that of the draft-frame, ground-supports pivotally depending from the draft-frame, connecting-levers and locking means for adjusting and securing the tooth-frame in a plane substantially parallel to the planes of the draft-frame and the ground-supports, substantially as described.

28. In a harrow, the combination of a draft-frame, a tooth-frame provided with teeth, levers pivotally connecting the frames and projecting downwardly to ground-supports, lever connection with locking means for shifting the planes of the frames and of the ground-supports, substantially as described.

29. In a harrow, in combination, a draft-frame, a tooth-frame with teeth, means for raising and lowering the tooth-frame comprising levers provided with locking means and carrying ground-supports and by which the tooth-frame may be elevated or depressed as the ground-supports are depressed or elevated, substantially as described.

30. In a harrow, in combination, a rigid draft-frame, a rigid tooth-frame, pivotally-mounted levers operatively connecting the frames, pivotally-mounted ground-supports in pivotal operative connections with the levers, operative means connected with the levers to adjust the relative position of the tooth-frame and the draft-frame and the ground-supports, substantially as described.

31. In a harrow, in combination, a rigid draft-frame, a rigid tooth-frame, pivotally-mounted levers operatively connecting the frames, operative means connected with the levers to adjust the relative position of the tooth-frame and the draft-frame, substantially as described.

32. In a harrow, in combination, a frame to which the draft is applied, a series of vertically-movable transverse tooth-bars, series of vertically-swinging levers connecting said tooth-bars to said frame, and manually-operated actuating and controlling mechanisms connected with said levers for swinging the same simultaneously to raise and lower the tooth-bars and hold the same in the desired adjustment, connecting means holding the tooth-bars from axial movement in their rise and fall, substantially as described.

33. In a harrow, in combination, a draft-frame, vertically-swinging levers fulcrumed to the draft-frame and arranged in corresponding series along opposite sides thereof, vertically-movable tooth-bars, each tooth-bar carried by a pair of said levers, a set-lever mounted on said frame and provided with locking means and connections from said set-lever to said vertically-swinging levers to raise and lower the same and the tooth-bars simultaneously, means connecting the tooth-bars and holding them from turning in the plane of their upward and downward motion, substantially as described.

34. In a harrow, in combination, a horizontally-disposed draft-frame, vertically-movable transverse tooth-bars connected together to form a tooth-frame parallel with the draft-frame, vertically-swinging levers connecting said frames and provided with extended ends, a set-lever connected with said extended ends to simultaneously swing said levers to raise and lower the tooth-frame, and locking means to hold said tooth-frame in the desired vertical position, substantially as described.

35. In combination, a draft-frame comprising side bars extending in the line of draft and having cross connections, vertically-movable transverse tooth-bars connected together to form a tooth-frame, levers fulcrumed to the draft-frame side bars and having corresponding arms pivotally joined to the tooth-frame to raise and lower the same, a set-lever mounted on one of said cross connections and having locking mechanism, and connections from said levers to rock the same, substantially as described.

36. In combination, a draft-frame vertically-swinging ground-supports, vertically-movable tooth-bars connected to form a tooth-frame, vertically-swinging levers carrying said tooth-frame and fulcrumed to said draft-frame, means for simultaneously swinging said levers to raise and lower the tooth-frame, and connections from said vertically-moving elements to said ground-supports to elevate the same when the tooth-bars are lowered, substantially as described.

Signed by me at Utica, New York, this 10th day of July, 1900.

HENRY M. LOVE.

Witnesses:
PHEBE A. TANNER,
VERNON W. LEE.